United States Patent [19]
Nilssen

[11] Patent Number: 5,010,468
[45] Date of Patent: * Apr. 23, 1991

[54] POWER-LINE-OPERATED HIGH FREQUENCY POWER SUPPLY

[76] Inventor: Ole K. Nilssen, Caesar Dr., Barrington, Ill. 60010

[*] Notice: The portion of the term of this patent subsequent to Jun. 9, 2004 has been disclaimed.

[21] Appl. No.: 463,455

[22] Filed: Jan. 11, 1990

Related U.S. Application Data

[63] Continuation of Ser. No. 40,809, Apr. 21, 1987, Pat. No. 4,908,754, which is a continuation of Ser. No. 679,929, Dec. 10, 1984, Pat. No. 4,680,506.

[51] Int. Cl.$^5$ .......................................... H02M 5/458
[52] U.S. Cl. ..................................... 363/37; 363/124; 363/132
[58] Field of Search ................ 363/17, 34, 37, 98, 363/132, 124

[56] References Cited

U.S. PATENT DOCUMENTS

| | | | |
|---|---|---|---|
| 4,244,016 | 1/1981 | Mitchell | 363/98 |
| 4,333,134 | 6/1982 | Gurwicz | 363/17 |
| 4,477,748 | 10/1984 | Grubbs | 315/306 |
| 4,506,318 | 3/1985 | Nilssen | 363/132 |
| 4,541,041 | 9/1985 | Park et al. | 363/132 |
| 4,652,797 | 3/1987 | Nilssen | 363/37 |
| 4,663,699 | 5/1987 | Wilkinson | 363/17 |
| 4,672,159 | 6/1987 | Nilssen | 363/98 |
| 4,680,506 | 7/1987 | Nilssen | 363/17 |
| 4,688,161 | 8/1987 | Covington | 363/37 |
| 4,723,098 | 2/1988 | Grubbs | 315/306 |
| 4,729,081 | 3/1988 | Nilssen | 363/98 |
| 4,745,539 | 5/1988 | Nilssen | 363/37 |
| 4,843,202 | 6/1989 | Smith | 363/132 |
| 4,853,832 | 8/1989 | Stuart | 363/98 |
| 4,890,216 | 12/1989 | Egawa | 363/98 |

Primary Examiner—Steven L. Stephan
Assistant Examiner—J. Sterrett

[57] ABSTRACT

In an inverter-type power supply, a self-oscillating full-bridge inverter is powered by unfiltered full-wave-rectified 120 Volt/60 Hz power line voltage and controllably triggered into oscillation each half-cycle of the power line voltage by way of triggering two of the bridge's four transistors into conduction simultaneously. This is accomplished by way of discharging a charged-up capacitor by way of a Diac through a special trigger winding on each of two saturable current feedback transformers; each of which controls a pair of the bridge transistors.

12 Claims, 2 Drawing Sheets

POWER-LINE-OPERATED HIGH FREQUENCY POWER SUPPLY

RELATED APPLICATIONS

This application is a continuation of application Ser. No. 07/040,809 filed Apr. 21, 1987; now U.S. Pat. No. 4,908,754, which is a continuation of application Ser. No. 06/679,929, filed on Dec. 10, 1984, now U.S. Pat. No. 4,680,506.

BACKGROUND OF THE INVENTION

1. Field of Invention

The present invention relates to power-line-operated electronic inverter-type power supplies for microwave ovens.

2. Prior Art

Power-line-operated electronic inverter-type power supplies for microwave ovens and other applications have been previously described, such as in Hester, U.S. Pat. No. 3,973,165, or in Kiuchi et al. U.S. Pat. No. 4,002,875. However, these previously described power supplies have not integrally addressed, let alone resolved, several basic issues associated with the practical application of such power supplies. These issues relate to: (i) the power factor by which the power supply draws power from the power line; (ii) the power factor at which the inverter supplies its output power; and (iii) the crest-factor of the current supplied to the magnetron, the crest-factor being the ratio of peak to average current.

BACKGROUND CONSIDERATIONS

In powering the magnetron in a microwave oven by way of a power-line-operated electronic inverter-type power supply, in order to achieve an acceptably good power factor in respect to the loading represented by the inverter, as well as in respect to the loading presented to the inverter, it is desirable to extract the power from the inverter by way of a tuned circuit. Otherwise, the Volt-Ampere product that must be supplied by the power line to the inverter, as well as the Volt-Ampere product that must be supplied by the inverter to the magnetron, get to be unacceptably large.

It is particularly desirable to power the magnetron by way of a high-Q resonant L-C circuit wherein the magnetron load is effectively parallel-connected across the tank capacitor of the L-C circuit, and wherein this L-C circuit is effectively series-connected across the inverter's output.

However, when such a high-Q series-excited resonant L-C circuit is not loaded, it acts in effect as a short circuit; which, if allowed to exist for even a very brief period, is apt to cause destructive overload of the inverter and/or the L-C circuit.

In an ordinary magnetron, a cathode must be heated to incandescence before electron emission starts and therefore before the magnetron becomes conductive; and this heating process or pre-conditioning is apt to require from one to two seconds.

Thus, aside from the relatively modest amount of power needed to accomplish the pre-conditioning, a magnetron is substantially a non-conducting load until its cathode has reached incandescence; which implies that, during this brief period of one to two seconds, the short circuit represented by the unloaded series-resonant L-C circuit is apt to cause destructive overload.

One way of preventing such destructive overload is that of connecting in parallel with the magnetron a voltage-limiting means (like a Varistor) characterized by: i) not conducting at the highest magnitude of voltage normally present across the magnetron when it is conducting; and ii) conducting heavily at a voltage of somewhat higher magnitude than that.

However, due to the significant amount of energy that must be absorbed by this voltage limiting means, being on the order of 1000 to 2000 Joule for a conditioning period of one to two seconds, the effective cost associated with such a method of preventing destructive overload of inverter and/or L-C circuit is very high.

In respect to the current crest-factor, it is noted that prior-art inverter-type magnetron power supplies provide to the magnetron unidirectional current pulses at the relatively high frequency of the inverter, but with the magnitude of these pulses varying roughly in proportion with the instantaneous magnitude of the power line voltage. The crest-factor resulting from this double-modulation of the magnetron current is particularly disadvantageous.

SUMMARY OF THE INVENTION

Objects of the Invention

An object of the present invention is that of providing a basis for designing power-line-operated, high-power-factor, high-efficiency, cost-effective, inverter-type microwave oven power supplies.

Another object is that of providing an inverter-type power supply that is operative to safely power a magnetron load that is parallel-connected with a series-excited high-Q resonant L-C circuit.

These as well as other important objects and advantages of the present invention will become apparent from the following description.

BRIEF DESCRIPTION

In its preferred embodiment, subject invention constitutes a power-line-operated electronic inverter-type power supply operable to provide pulsed anode current to the magnetron in a microwave oven. This power supply comprises a full-wave rectifier providing its non-filtered pulsed DC voltage output to a full-bridge inverter operable to series-excite a high-Q parallel-loaded resonant L-C circuit. The parallel-loading is provided by the magnetron; which, however, is of such nature as to have to be conditioned for a period of about two seconds before becoming fully operative as a load. This pre-conditioning involves heating the magnetron cathode to the point of thermionic incandescence.

Power to heat the magnetron cathode is provided by way of a small transformer connected directly with the power line. However, to prevent the unloaded series-resonant L-C circuit from overloading the inverter during the brief period it takes for the magnetron cathode to reach incandescence, the inverter is prevented from operating until after the cathode has reached incandescence.

To ascertain a good crest-factor in respect to the current provided to the magnetron, filtering means have been provided by which high frequency modulations of the magnetron current are substantially eliminated.

DESCRIPTION OF THE PREFERRED EMBODIMENT

Details of Construction

Figure 1:
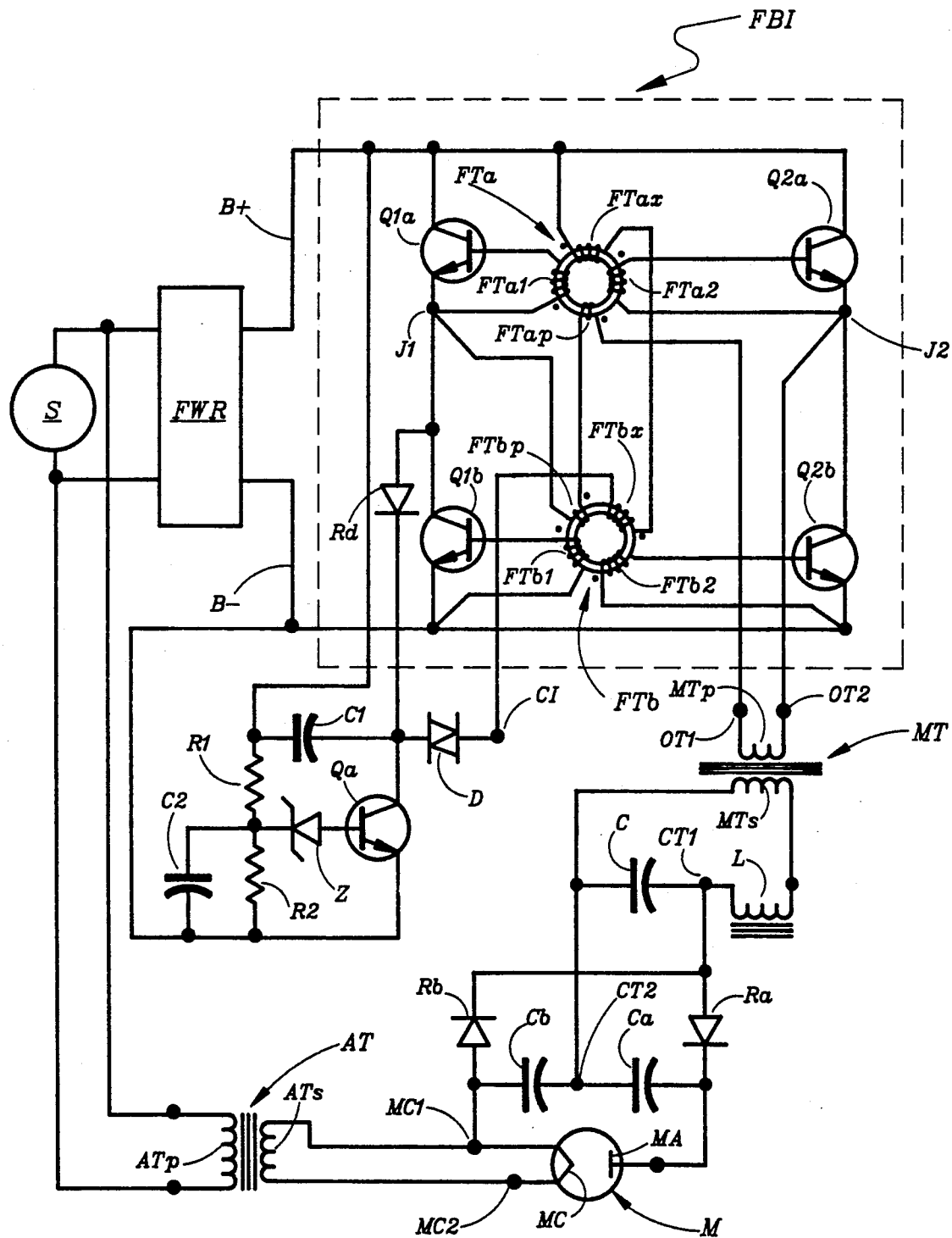
FIG. 1 provides a schematic circuit diagram of the preferred embodiment of the invention.

FIG. 1 shows an AC voltage source S, which in reality is an ordinary 120 Volt/60 Hz electric utility power line.

Connected to S is a full-wave rectifier FWR that rectifies the AC voltage from S to provide an unfiltered DC voltage between a positive power bus B+ and a negative power bus B−.

A first pair of transistors Q1a and Q1b are connected in series between the B+ bus and the B− bus in such a way that the collector of Q1a is connected to the B+ bus, the emitter of Q1a is connected with the collector of Q1b at a junction J1, and the emitter of Q1b is connected with the B− bus.

A second pair of transistors Q2a and Q2b are connected in series between the B+ bus and the B− bus in such a way that the collector of Q2a is connected to the B+ bus, the emitter of Q2a is connected with the collector of Q2b at a junction J2, and the emitter of Q2b is connected with the B− bus.

Primary winding FTap of saturable feedback transformer FTa and primary winding FTbp of saturable feedback transformer FTb are connected in series between junction J1 and output terminal OT1. Another output terminal OT2 is connected with junction J2.

A first secondary winding FTa1 of feedback transformer FTa is connected between the base and the emitter of transistor Q1a; and a second secondary winding FTa2 of the same transformer FTa is connected between the base and the emitter of transistor Q2a.

A first secondary winding FTb1 of feedback transformer FTb is connected between the base and the emitter of transistor Q1b; and a second secondary winding FTb2 of the same transformer FTb is connected between the base and the emitter of transistor Q2b.

Auxiliary winding FTax on transformer FTa and auxiliary winding FTbx on transformer FTb are connected in series between the B+ bus and a control input terminal CI.

The full-bridge inverter assembly consisting of transistors Q1a, Q1b, Q2a and Q2b, as connected in circuit with feedback transformers FTa and FTb, is referred to as FBI.

Primary winding ATp of auxiliary transformer AT is connected with source S; and secondary winding ATs of transformer AT is connected with magnetron cathode terminals MC1 and MC2 of magnetron M.

Primary winding MTp of main transformer MT is connected between output terminals OT1 and OT2. An inductor L and a capacitor C are series-connected directly across the secondary winding MTs of transformer MT. Capacitor C is connected between capacitor terminals CT1 and CT2, with CT1 being the point at which capacitor C is connected with inductor L.

Capacitor terminal CT1 is connected with the anode of a rectifier Ra and with the cathode of another rectifier Rb. Two capacitors Ca and Cb are series-connected between the cathode of rectifier Ra and the anode of rectifier Rb. The two capacitors are connected together at capacitor terminal CT2.

The cathode of rectifier Ra is connected with the magnetron anode MA; and the anode of rectifier Rb is connected to magnetron cathode terminal MC1.

A capacitor C1 and a Diac D are connected in series between the B+ bus and control input terminal CI. An auxiliary transistor Qa is connected with its collector to the junction between C1 and D, and with its emitter to the B− bus. A resistor R1 is connected between the B+ bus and the cathode of a Zener diode Z; and a parallel-combination of a resistor R2 and a capacitor C2 is connected between the cathode of Z and the B− bus. The anode of Z is connected with the base of Qa. A rectifier Rd is connected with its cathode to the collector of Qa and with its anode to the collector of Q1b.

Explanation of Waveforms

Figure 2:
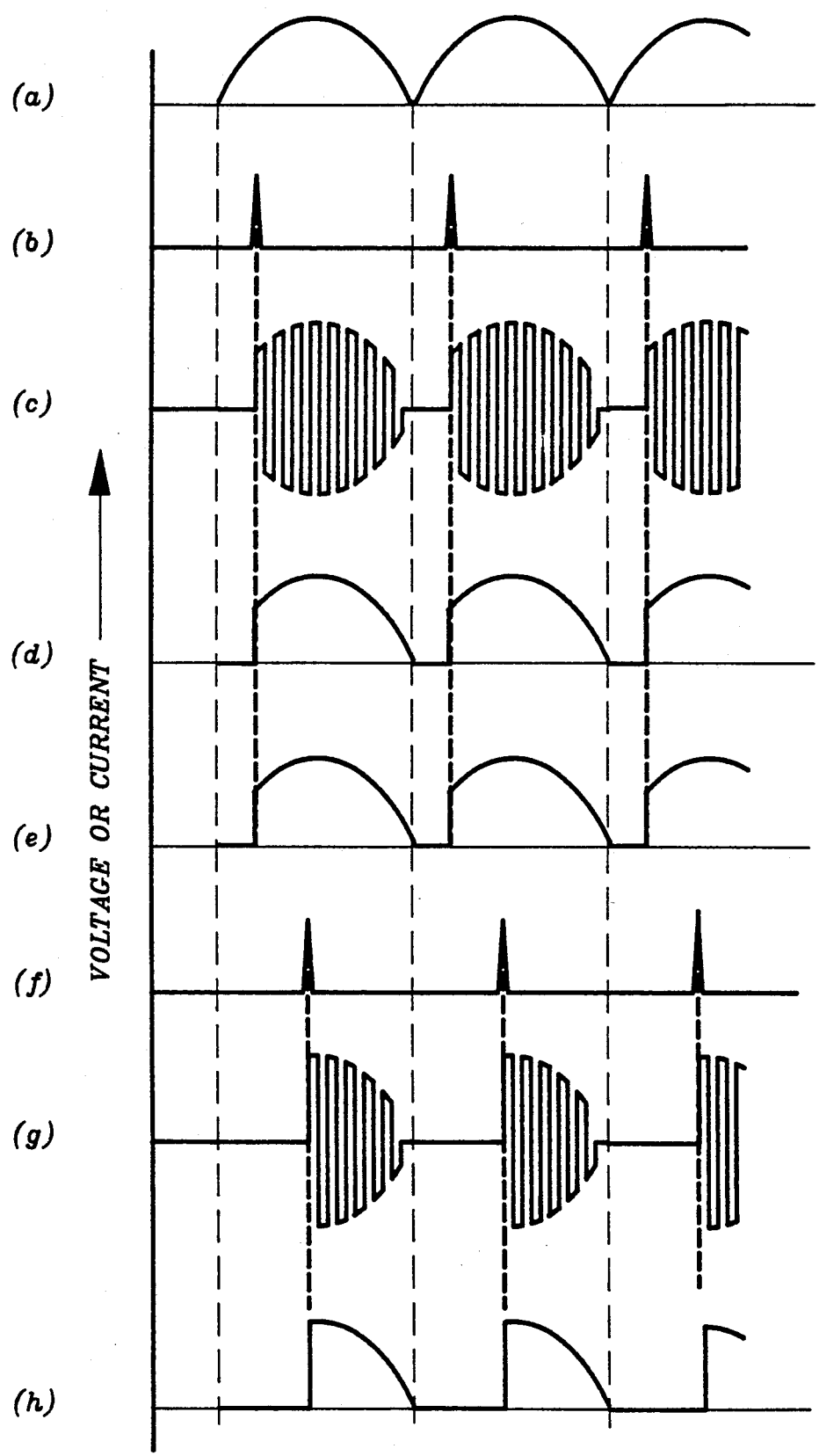
FIG. 2 shows various voltage and current waveforms associated with different aspects of the preferred embodiment.

FIG. 2a shows the full-wave rectified 120 Volt/60 Hz power line voltage as present between the B− bus and the B+ bus.

FIG. 2b shows the trigger pulses provided to control input terminal IC.

FIG. 2c shows the high-frequency squarewave voltage provided between inverter output terminals OT1 and OT2.

FIG. 2d indicates the shape of the anode current provided to the magnetron.

FIG. 2e shows the corresponding current drawn by the inverter from the full-wave rectifier.

FIGS. 2f–2h show the waveforms of FIGS. 2b–2d for the situation of providing delayed trigger pulses to the inverter.

Description of Operation

The operation of the arrangement of FIG. 1 may be explained as follows.

The full-bridge inverter is arranged with positive current-feedback by way of saturable current transformers FTa and FTb in such a way as to self-oscillate, provided however that a DC voltage of adequate magnitude is present between the B+ bus and the B− bus and that a triggering current pulse has been provided through auxiliary windings FTax and FTbx.

Assuming the polarity of the triggering pulse to be negative (i.e., equivalent to positive current flowing out of control input terminal CI) and adequate in magnitude, the effect of the triggering pulse is that of momentarily rendering transistors Q2a and Q1b conductive; which then starts current flowing from the B+ bus, through Q2a and the primary winding of main transformer MT, in direction from J2 to J1, and then though Q1b to the B− bus. Hence, current starts flowing through primary windings FTap and FTbp of the feedback transformers in such a direction as to perpetuate the conductive states of transistors Q2a and Q1b.

However, feedback transformers FTa and FTb are both saturable; and after a brief period, both of these feedback transformers saturate, at which point base current ceases to be provided to the two conducting transistors Q2a and Q1b, thereby rapidly rendering them non-conductive.

Due to inductively stored energy (as stored in inductance associated with transformer MT and/or its load) current will continue to flow from junction J2 to junction J1 for some brief period after transistors Q2a and Q1b have ceased to conduct. This current will flow until the inductively stored energy has been discharged.

However, the path of this discharging inductive current will not be through transistors Q2a and Q1b. Rather, it will be through transistors Q2b and Q1a: on the one side it will flow from the B− bus, through the FTb2 winding, through the base-collector junction of transistor Q2b, and to junction J2; while on the other side it will flow from junction J1, through winding FTa1, through the base-collector junction of transistor Q1a, and to the B+ bus.

Due to charge storage effects in the transistor junctions, and as a result of the reverse current-flow through transistors Q2b and Q1a, these two transistors have both been rendered temporarily conductive in their forward directions. Hence, both these transistors will be forwardly conductive for a brief period after the inductive discharge current has stopped flowing therethrough. During this brief period, forward current starts flowing from the B+ bus, through transistor Q1a, from junction J1 through primary winding MTp to J2, through transistor Q2b, and then to the B− bus, thereby initiating a new self-sustaining inverter cycle.

Thus, as long as the magnitude of the DC voltage present between the B+ bus and the B− bus is above a certain minimum level, the inverter will exhibit self-sustaining oscillations, thereby providing a squarewave voltage between its output terminals OT1 and OT2.

Except for relatively small voltage drops across the transistors, the absolute magnitude of this output squarewave voltage will be the same as that of the DC voltage between the B+ bus and the B− bus. Thus, as the magnitude of this DC voltage varies, so does the magnitude of the squarewave voltage.

However, if the magnitude of the DC voltage drops below a certain minimum level—which level might typically be about 15 Volt—the inverter is no longer capable of self-sustained operation, and the oscillation ceases.

Thus, since the DC voltage present between the B+ bus and the B− bus—being unfiltered full-wave-rectified 60 Hz AC voltage—consists of a series of sinusoidally-shaped DC voltage pulses provided at a rate of 120 Hz (see FIG. 1a), the inverter must cease its oscillation toward the end of each voltage pulse. Hence, for inverter output to be provided on a continuous basis, the inverter must be re-triggered into oscillation for each and every one of the voltage pulses—as indicated by FIG. 2b—with the resulting inverter output then being a series of periodic intermittent bursts of squarewave voltage, as illustrated in FIG. 2c.

By varying the timing of the trigger pulses relative to the phasing of the voltage pulses, the time period during which the inverter oscillates can be varied in a manner identical with the way the conduction angle of a Triac or SCR can be varied. By not providing trigger pulses at all, the inverter simply does not oscillate and no inverter output results.

FIGS. 2f, 2g and 2h depict a situation of reduced power output from the inverter, where the trigger pulses are provided approximately in the middle of each of the DC voltage pulses.

Trigger pulses are provided to the inverter at the IC terminal by way of the trigger assembly consisting of transistor Qa, Diac D, Zener diode Z, resistors R1/R2 and capacitors C1/C2.

More particularly, as soon as power line voltage is applied to rectifier FWR, capacitor C2 starts to charge by way of current flowing through resistor R1 from the B+ bus. After about one to two seconds, capacitor C2 has been charged up to a voltage high enough so that current starts flowing through Zener diode Z and into the base of transistor Qa; and from that point on, except for a small amount of leakage current flowing through resistor R2, all the current provided by R1 flows into the base of Qa. With current flowing into its base, Qa now becomes conductive and starts to charge capacitor C1 at a relatively rapid rate. As soon as the voltage on C1 grows to sufficient magnitude, Diac D breaks down and provides a brief pulse to the CI terminal, thereby starting the inverter oscillating.

The time constant associated with charging C1 to the point of Diac breakdown is chosen to be about one milli-second from the beginning of one of the sinusoidally-shaped DC voltage pulses provided from the rectifier; with the result being to provide triggering pulses as indicated by FIG. 1b.

Rectifier Rd connected between the collector of Qa and the collector of Q1b serves to keep C1 discharged and thereby to prevent additional (and redundant) pulses from being provided to the CI terminal as long as the inverter is oscillating.

Resistor R2 serves to discharge C2 after the whole power supply is disconnected from the power line, thereby making certain that capacitor C2 is fully discharged whenever power line voltage is re-applied to the power supply.

Thus, the function of the trigger assembly is that of providing repetitive triggering of the inverter as required for its proper functioning, in accordance with FIG. 2b, but not until about one or two seconds after applying power line voltage to the whole power supply.

The voltage provided across the series-connected inductor L and capacitor C from secondary winding MTs of main transformer MT is substantially of the same shape as that provided across the inverter output terminals, but is larger in magnitude. The L and the C are chosen such as to have relatively high Q-factors and to be substantially series-resonant at the frequency of the squarewave inverter output voltage (which is approximately of 30 kHz fundamental frequency). In response to this squarewave voltage, the current flowing through the L-C series-resonant circuit will be substantially sinusoidal of waveshape and in phase with the fundamental frequency component of the squarewave voltage. In turn, this means that—absent some form of loading means—the AC voltage developed across capacitor C will be sinusoidal of waveshape and very large in magnitude.

In this connection, as an example based on a situation with ideal components, with an unloaded circuit Q-factor of 100 and with the voltage provided across secondary winding MTs being about 1000 Volt, it is noted that the voltage developing across the capacitor would be about 100,000 Volt. Of course, with real components, such a voltage magnitude will not be reached; and the circuit will instead become non-linear and/or destructively overloaded.

Under normal conditions, the magnetron will represent a voltage-limiting load to the L-C circuit, thereby preventing the circuit from becoming non-linear and/or overloaded. However, during the brief period before the magnetron's cathode reaches a point of substantial thermionic emission, the magnetron does not provide any loading.

This delay associated with enabling the magnetron's cathode to become incandescent represents the reason for providing a delay in providing trigger pulses to the inverter.

However, due to the delay in starting the inverter, the magnetron will indeed provide an adequate load for the L-C circuit—the cathode having been sufficiently heated by voltage from transformer AT by the time the inverter starts to operate.

The voltage present across C, and therefore across terminals CT1 and CT2, is provided to a voltage-doubling rectifier/filter means consisting of Ra, Rb, Ca and Cb. The output of this voltage-doubling rectifier/filter means consists of a series of periodic intermittent DC voltage pulses occurring at the rate of 120 Hz. Due to the particular voltage-current characteristics of the magnetron, the shape of these voltage pulses will be nearly trapezoidal.

On the other hand, as illustrated in FIG. 2d, the current provided to the magnetron will be in the form of periodic intermittent unidirectional pulses of shape nearly identical to that of the DC voltage pulses existing between the B+ bus and the B− bus.

In this connection, it is noted that the magnitude of the current provided to a constant-voltage load connected in parallel with the capacitor in a series-resonant L-C circuit is approximately proportional to the magnitude of the AC voltage provided at the input to the series-resonant circuit. That is, the instantaneous magnitude of the current provided to the load is roughly proportional to the instantaneous magnitude of the AC voltage provided at the input to the series-resonant circuit.

In other words, a high-Q series-resonant circuit voltage-fed from an AC source and with its load connected in parallel with its tank capacitor, represents a highly attractive way to power a load such as a magnetron, which is nearly a constant-voltage load and ideally requires a constant current power source. By way of such an arrangement, the current provided to the magnetron load will be proportional to the magnitude of the voltage applied; which is to say that, by way of the high-Q L-C circuit, the series-connected voltage source gets converted to a current source for a parallel-connected load.

Thus, in the circuit of FIG. 1, as long as the inverter oscillates, the magnitude of the resulting magnetron current (FIG. 2d) will be roughly proportional to the magnitude of the DC voltage present between the B+ bus and the B− bus (FIG. 2a); which makes the magnitude of the current drawn by the inverter (FIG. 2e) roughly proportional to the magnitude of this DC voltage; which, in turn, makes the instantaneous magnitude of the current drawn from the AC source S roughly proportional to the instantaneous magnitude of the voltage provided therefrom.

Hence, the power factor of the Volt-Ampere product drawn from AC source S is very good.

To provide for proper voltage-doubling, as well as to minimize high-frequency (30 kHz and up) ripple (or magnitude modulations) of the unidirectional current pulses provided to the magnetron, it is important that capacitors CMa and CMb be of adequate energy-storing capability. However, with an inverter frequency of about 30 kHz, and with the typical magnetron requiring an input power of approximately 1000 Watt, it is adequate if these capacitors store an amount of energy that is somewhat larger than the amount of energy drawn by the magnetron during one complete cycle of the 30 kHz inverter voltage. Thus, capacitors CMa and CMb should each be capable of storing approximately 50 milli-Joule.

Otherwise, the following points should be noted.

(a) The power supplied to the magnetron depends on the timing or phasing of the trigger pulses provided to the inverter. In turn, the timing of these trigger pulses depends on the delay associated with the process of charging capacitor C1 to a voltage high enough to cause breakdown of Diac D. The length of this delay can be adjusted over a wide range by adjusting the resistance of R1.

Hence, by making R1 an adjustable resistor, the amount of power provided to the magnetron may be adjusted over a wide range.

(b) If the magnetron current were provided from unfiltered rectified 30 kHz AC voltage, then—in order to provide for a given amound of average magnetron power—it would be necessary that the peak magnitudes of the resulting 30 kHz current pulses be very much larger than the peak current that results without when there is filtered rectification of the 30 kHz voltage; which would therefore result in highly unattractive magnetron current crest factor.

(c) Automatically controlled provision and/or phasing of the trigger pulses shown in FIGS. 2b and 2f can be accomplished in a number of well known ways, the details of which form no part of this invention.

(d) It is important that the length of time that it takes for the saturable feedback transformers FTa and FTb to saturate be somewhat shorter than the period of the natural resonance frequency of the series-combination of inductor L and capacitor C. Ideally, the transformer saturation time should be such that when it is added to the transistor's storage time, the total equals the period of the natural resonance frequency.

(e) Tank inductor L of the L-C resonant circuit does not have to be an individual component separate and apart from main transformer MT. Rather, in most situations, L can simply be an integral part of MT, represented by the leakage inductance of its secondary winding MTs.

(f) The overall operation of the magnetron power supply arrangement of FIG. 1 may be summarized as follows.

(i) As soon as the power supply arrangement is connected with a proper voltage source, heating power starts being supplied to the magnetron cathode; which cathode will reach incandescence within a time period of about one second, thereby rendering the magnetron fully functioning.

(ii) Unfiltered full-wave-rectified power line voltage is applied to an inverter; and the high-frequency voltage output from this inverter is applied, by way of a step-up voltage transformer, across a series-resonant high-Q L-C circuit. The voltage developing, with the help of so-called Q-multiplication, across the tank capacitor of this L-C circuit is used for application to the magnetron after rectification by way of a voltage-doubling rectifier and filter assembly.

(iii) Due to the delay associated with providing trigger pulses, the inverter does not start operation until after the magnetron cathode has had a chance to reach incandescence. Thus, when the inverter does start to operate, the magnetron is fully functional and ready to act as an effective parallel-connected load on the series-excited resonant L-C circuit.

(iv) With the magnetron being powered from the inverter by way of a series-excited parallel-loaded resonant L-C circuit, the power factor associated with the inverter's Volt-Ampere output is very good. Moreover, as indicated by FIG. 2e, which shows the current drawn by the inverter from the full-wave power line rectifier (FWR), the power factor of the Volt-Ampere input to the overall power supply arrangement from the power line is likewise very good.

It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   a power line providing an AC voltage at a pair of power line terminals; the AC voltage having a first fundamental period and a first fundamental frequency; and
   a frequency-converting power supply connected with the power line terminals and operative to provide a high frequency output voltage at a pair of power output terminals; the high frequency output voltage having a second fundamental frequency; the second fundamental frequency being substantially higher than the first fundamental frequency; the frequency-converting power supply including:
   (i) a rectifier connected with the power line terminals and operative to provide a substantially unfiltered DC voltage at a set of DC terminals; the absolute instantaneous magnitude of the DC voltage being, at least during half of said first fundamental period, substantially equal to that of the AC voltage; and
   (ii) bridge inverter means connected in circuit between the DC terminals and the power output terminals; the bridge inverter means being operative to provide the high frequency output voltage; the absolute instantaneous magnitude of the high frequency output voltage being substantially equal to that of the DC voltage;
   whereby, at least during half of said first fundamental period, the absolute instantaneous magnitude of the high frequency output voltage is substantially equal to that of the AC voltage.

2. The arrangement of claim 1 wherein the high frequency output voltage is provided in the form of individual bursts of squarewave voltage separated by periods of zero magnitude; an individual burst occurring at least once during each of said first fundamental periods.

3. The arrangement of claim 2 wherein: (i) each of said periods of zero magnitude has a duration; and (ii) the bridge inverter means includes control means operative to permit control of this duration.

4. The arrangement of claim 1 wherein a load means is connected in circuit with the power output terminals; the load means including a tuned L-C circuit.

5. The arrangement of claim 1 wherein the absolute instantaneous magnitude of the high frequency output voltage is substantially equal to zero except during periods when it is substantially equal to the absolute instantaneous magnitude of the AC voltage.

6. The arrangement of claim 1 wherein the absolute instantaneous magnitude of the DC voltage is substantially equal to that of the AC voltage.

7. An arrangement comprising:
   a power line providing an AC voltage at a pair of power line terminals; the AC voltage having a first fundamental period and a first fundamental frequency; and
   a frequency-converting power supply connected with the power line terminals and operative to provide a high frequency output voltage at a pair of power output terminals; the high frequency output voltage having a second fundamental frequency; the second fundamental frequency being substantially higher than the first fundamental frequency; the frequency-converting power supply including:
   (i) a rectifier connected with the power line terminals and operative to provide a DC voltage at a set of DC terminals; the absolute instantaneous magnitude of the DC voltage being substantially equal to that of the AC voltage; and
   (ii) inverter means connected in circuit between the DC terminals and the power output terminals; the inverter means being operative to provide the high frequency output voltage by way of causing each one of the power output terminals to be electrically and alternatingly connected, substantially without any intervening impedance and as long as the high frequency output voltage is indeed being provided, with one of the DC terminals, thereby to cause the absolute instantaneous magnitude of the high frequency output voltage to be substantially equal to that of the DC voltage.

8. An arrangement comprising:
   a power line providing an AC voltage at a pair of power line terminals; the AC voltage having a first fundamental period and a first fundamental frequency; and
   a frequency-converting power supply connected with the power line terminals and operative to provide a high frequency output voltage at a pair of power output terminals; the high frequency output voltage having a second fundamental period and a second fundamental frequency; the second fundamental frequency being substantially higher than the first fundamental frequency; the frequency-converting power supply including:
   (i) a rectifier connected with the power line terminals and operative to provide a substantially unfiltered DC voltage at a set of DC terminals; the absolute instantaneous magnitude of the DC voltage being, at least during half of said first fundamental period, substantially equal to that of the AC voltage; and
   (ii) bridge inverter means connected in circuit between the DC terminals and the power output terminals; the bridge inverter means being operative to provide the high frequency output voltage; the average absolute magnitude of the high frequency output voltage, when averaged over the duration of said second fundamental period, being substantially equal to that of the DC voltage when averaged over the same duration.

9. A combination comprising:

a source operable to provide a DC voltage having absolute instantaneous magnitude substantially equal to that of an ordinary AC power line voltage; the AC power line voltage having a first fundamental period and a first fundamental frequency; and a full bridge inverter circuit powered from the DC voltage and operative to provide an output of high frequency voltage; the high frequency voltage having a second fundamental period and a second fundamental frequency; the second fundamental frequency being substantially higher than the first fundamental frequency; the high frequency voltage being provided in the form of individual bursts of high frequency AC voltage separated by periods of zero magnitude voltage; the bursts occurring at a frequency equal to a whole multiple of said first fundamental frequency.

10. The combination of claim 9 wherein: (i) each of said periods has a duration; and (ii) the full bridge inverter circuit has control means operative to permit control of this duration.

11. An arrangement comprising:

a power line providing an AC voltage at a pair of power line terminals; the AC voltage having a first fundamental period and a first fundamental frequency; and a frequency-converting power supply connected with the power line terminals and operative to provide a high frequency output voltage at a pair of power output terminals; the high frequency output voltage having a second fundamental frequency; the second fundamental frequency being substantially higher than the first fundamental frequency; the frequency-converting power supply including:

(i) a rectifier connected with the power line terminals and operative to provide a DC voltage at a set of DC terminals; the absolute instantaneous magnitude of the DC voltage being substantially equal to that of the AC voltage; and (ii) inverter means connected in circuit between the DC terminals and the power output terminals; the inverter means being operative to provide the high frequency output voltage; the absolute instantaneous magnitude of the high frequency output voltage being substantially equal to that of the DC voltage, except for a part of each of said first fundamental periods; during which part the absolute instantaneous magnitude of the high frequency voltage is substantially equal to zero.

12. The arrangement of claim 11 wherein, as long as the absolute instantaneous magnitude of the high frequency voltage is indeed equal to that of the AC voltage, one of the power output terminals is electrically connected, substantially all of the time and substantially without any intervening impedance, with one or the other of the DC terminals.

* * * * *